United States Patent [19]

Cox et al.

[11] 4,402,046
[45] Aug. 30, 1983

[54] INTERPROCESSOR COMMUNICATION SYSTEM

[75] Inventors: George W. Cox, Portland; Justin R. Rattner, Aloha, both of Oreg.

[73] Assignee: Intel Corporation, Santa Clara, Calif.

[21] Appl. No.: 290,135

[22] Filed: Aug. 5, 1981

Related U.S. Application Data

[63] Continuation of Ser. No. 972,010, Dec. 21, 1978, abandoned.

[51] Int. Cl.³ .......................................... G06F 13/00
[52] U.S. Cl. ................................................ 364/200
[58] Field of Search ...................... 364/200 MS File

[56] References Cited

U.S. PATENT DOCUMENTS

| | | | |
|---|---|---|---|
| 3,419,849 | 12/1968 | Anderson et al. | 364/200 |
| 3,483,520 | 12/1969 | Broderick et al. | 364/200 |
| 3,528,062 | 9/1970 | Lehman et al. | 364/200 |
| 3,551,892 | 12/1970 | Driscoll, Jr. | 364/200 |
| 3,566,363 | 2/1971 | Driscoll, Jr. | 364/200 |
| 3,735,360 | 5/1973 | Anderson et al. | 364/200 |
| 4,204,251 | 5/1980 | Brudevold | 364/200 |

Primary Examiner—Thomas M. Heckler
Attorney, Agent, or Firm—Owen L. Lamb

[57] ABSTRACT

A communication mechanism for use in a multi-processing system wherein several processors share a common memory. Each processor has associated with it a local communication segment, stored in memory. The local communication segment is for processor-specific communication. Another segment, the global communication segment, is common to all processors, and is for system-wide communication. Each communication segment has a field containing control flags. The flags are set by one processor and later inspected by the same or another processor. The inspecting processor is instructed to perform a number of functions specified by the state of the control flags. A count field and a lock field are provided in all communication segments to interlock access to the communication mechanism. A status field is provided in the local communication segments. Processors take the state of the status field into consideration when interpreting the control flags.

1 Claim, 10 Drawing Figures

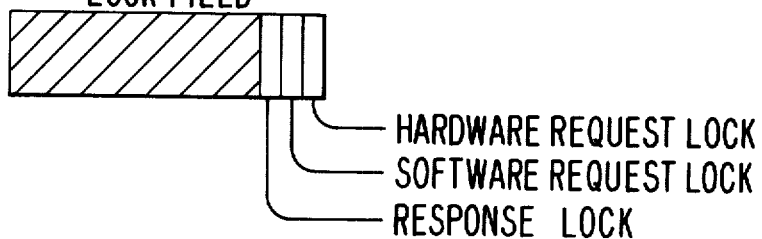
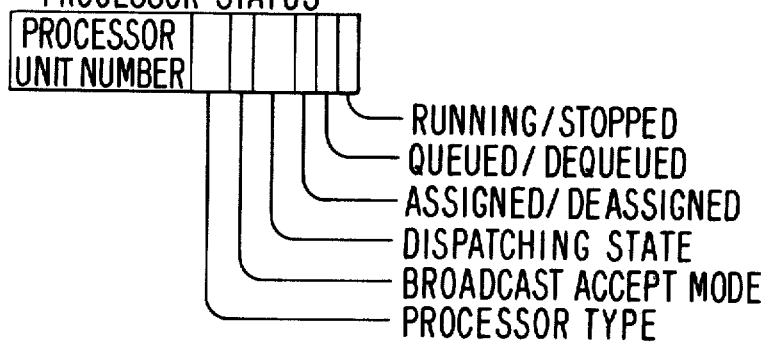
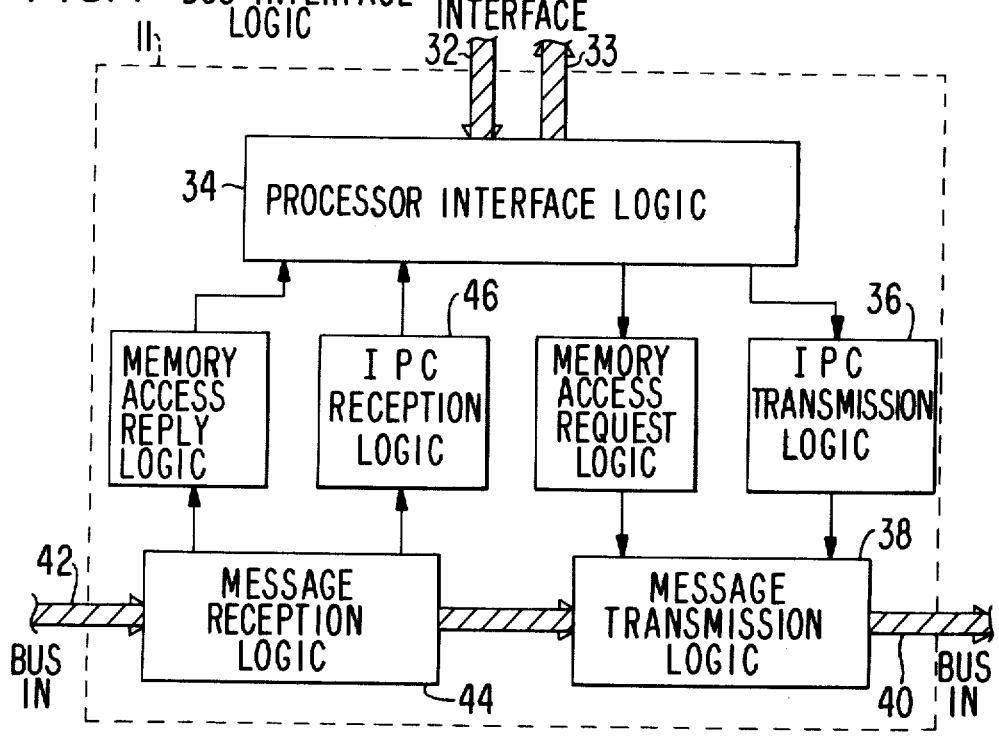

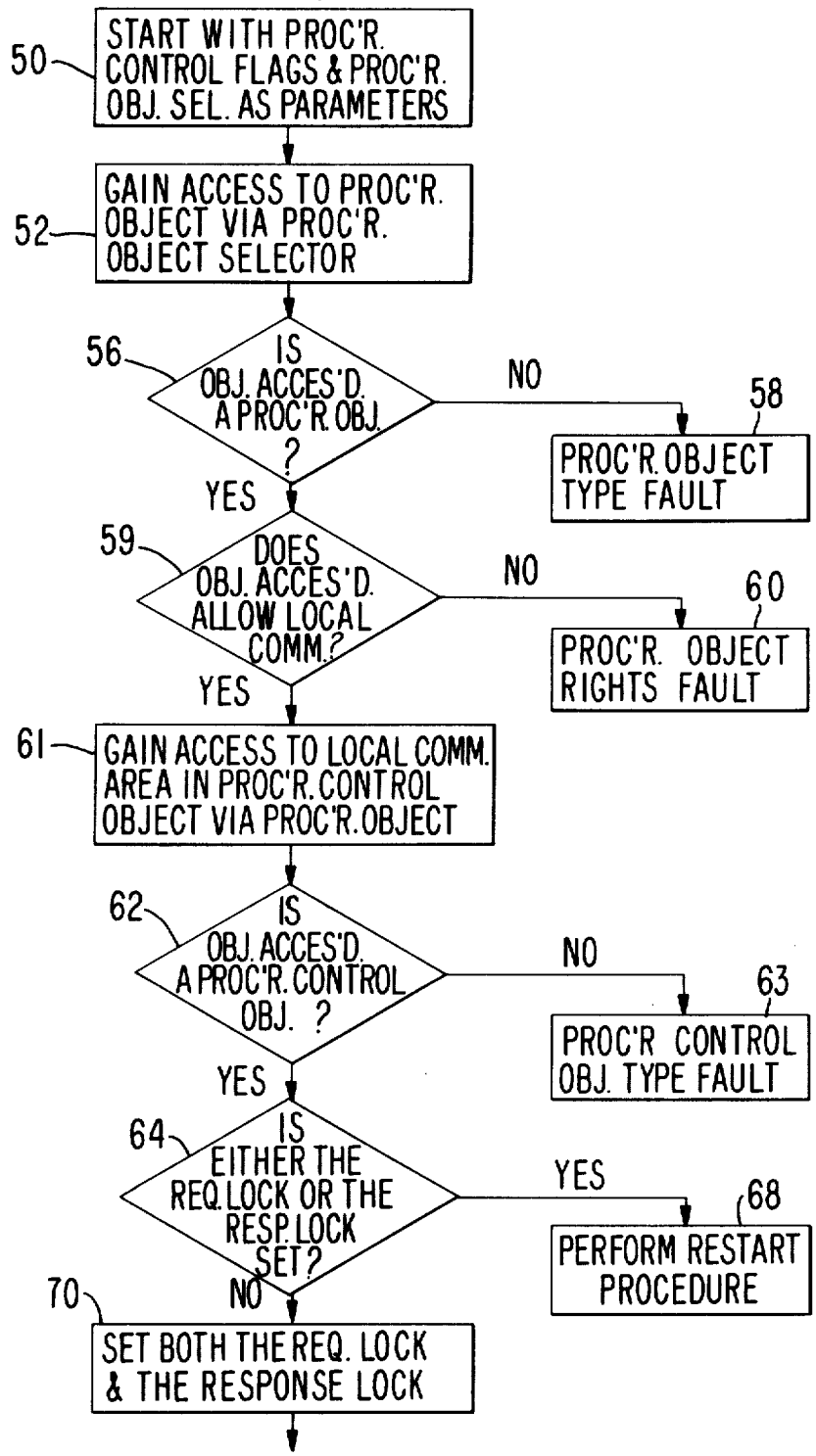

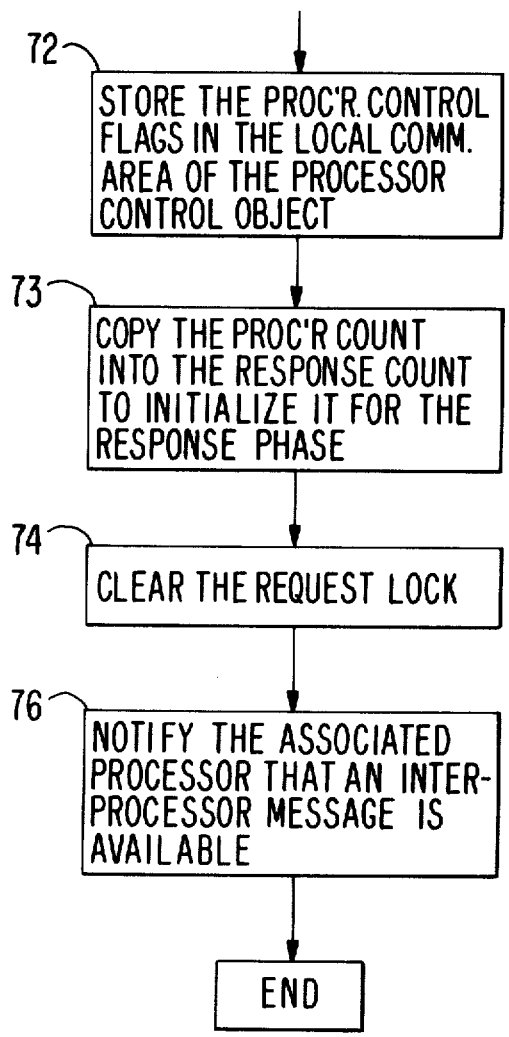
FIG. 5 - CONT'D.

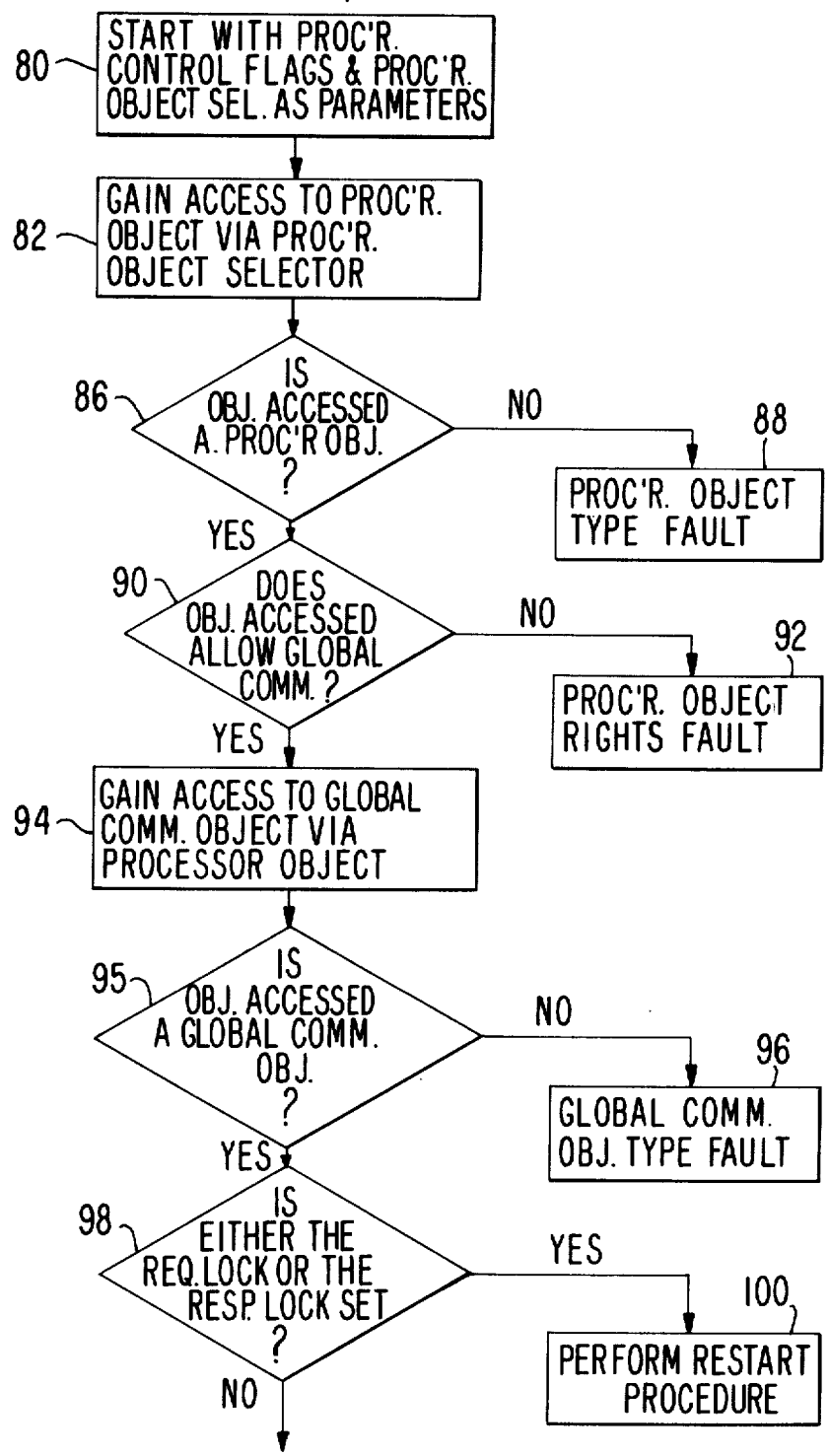
FIG. 6 - REQUEST PHASE, GLOBAL COMMUNICATION

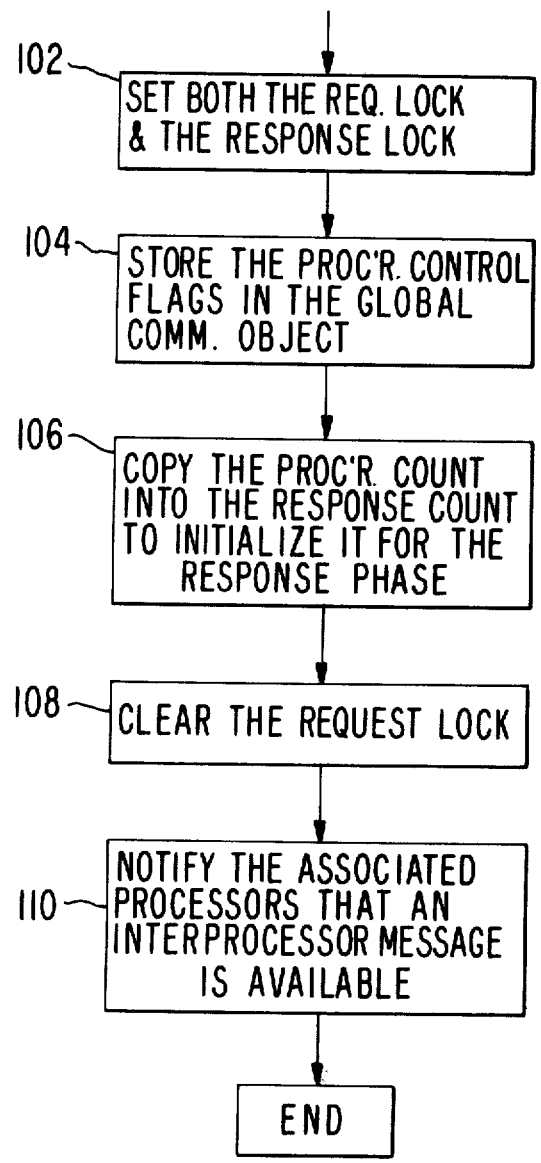
FIG. 6-CONT'D.

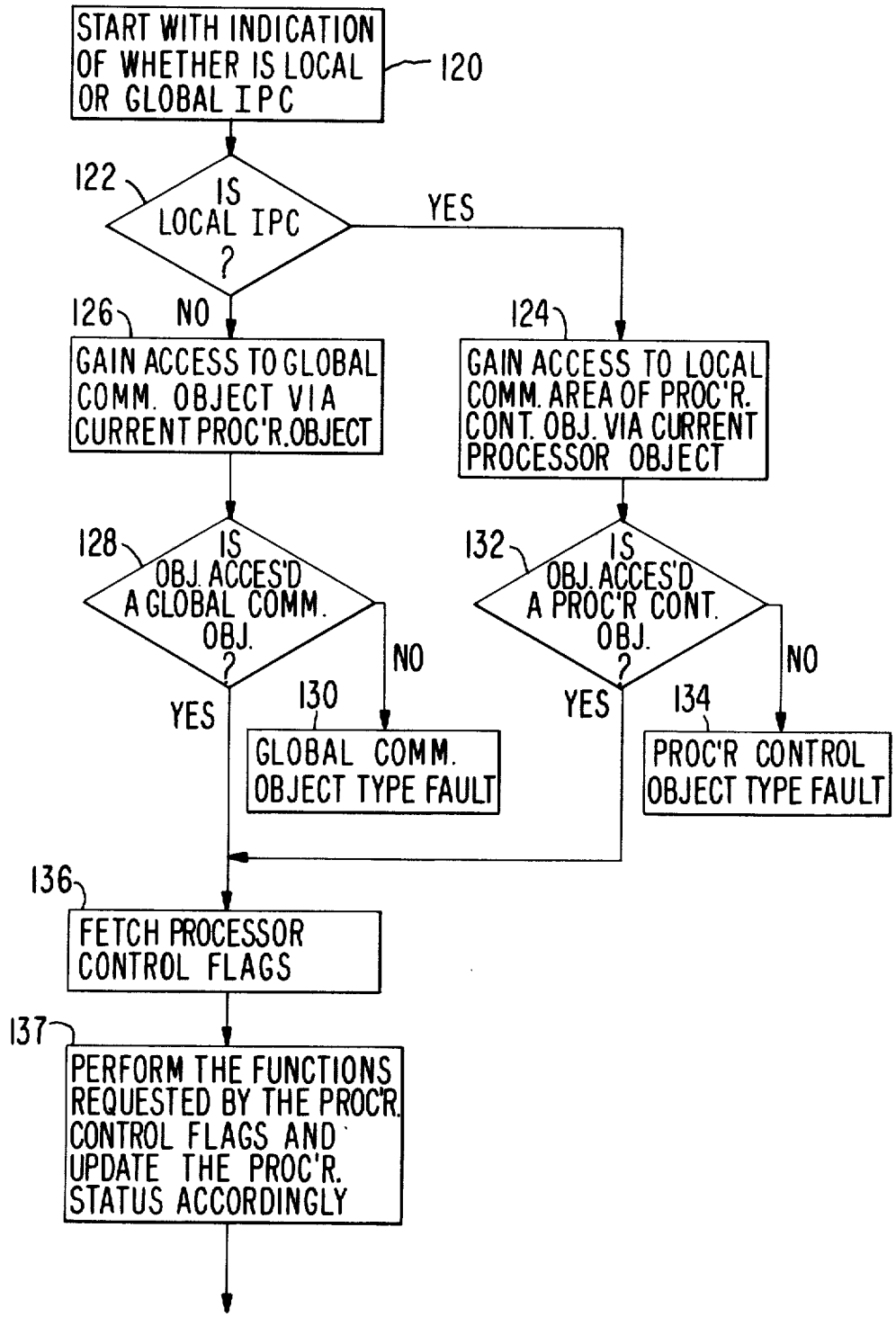
FIG. 7-RESPONSE PHASE

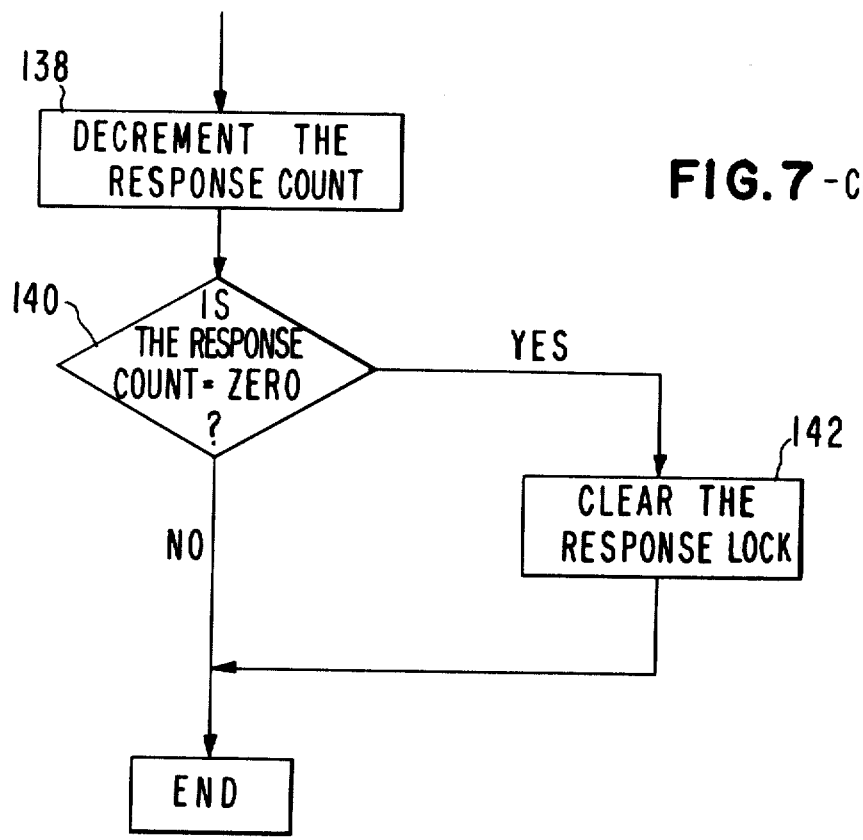
FIG. 7 -CONT'D.

INTERPROCESSOR COMMUNICATION SYSTEM

This application is a continuation, of application Ser. No. 05/972,010, filed Dec. 12, 1978, abandoned.

BACKGROUND OF THE INVENTION

1. Field of the Invention

This invention relates to multiprocessing systems and more particularly to apparatus for providing communication between processors in such a system.

2. Description of the Prior Art

In a multiprocessing system wherein several processors share a common memory, numerous concurrent functions or tasks may be multiplexed by the processors. Facilities must be provided for insuring necessary isolation and communication between tasks, and for assigning available processors to tasks which are ready to be executed.

In addition, a mechanism must be provided by which processors can signal each other. For example, a processor must be able to signal an idle processor that a task has become available for execution.

A number of techniques have been employed in the past to perform this communication function. The following summary of prior patents illustrates the current state of the art.

In Belt etal U.S. Pat. No. 3,541,517 communication between processors in a multiprocessing system is handled by a central controller which is coupled to communicate with all the processors and with a shared memory. The central controller has a "communication set" in memory which identifies a particular program to be executed. The controller then notifies one of the processors to execute the program. When a processor reaches a point where it is free, it fetches the communication set, and using the parameters therein gets and executes the program.

Driscoll U.S. Pat. No. 3,551,892 utilizes the central timer locations set aside for each processor. The timer locations are extended in size so that the system control software can leave messages to a potential recipient in the special storage area, one for each processor, adjacent the processor's central timing location. A send message instruction executed by a sending processor locates the special storage therein. At fixed times during the operational cycle of each processor the processor accesses the storage at the special storage location assigned to it to see if any messages are present. If a message is present the processor fetches the message and performs the task associated therewith. This system relies on a supervisory program and on the IBM system 360 condition code mechanism to provide software control for synchronizing the processors. For example the system 360 test and set instruction provides the interlock for two processors competing for the same message storage location. This patent provides for communication to a specific processor.

Barner U.S. Pat. No. 3,771,137 is an example of a broadcast type of system. A number of processors are each equipped with a buffer memory. A broadcast system allows any processor to query via a memory control all other processors to determine whether desired data is in one of the other processor's buffer. If the data is present in one of the other processor's buffer, memory control transfers the data to main memory to update the copy in memory (a read cycle followed by a write cycle). This patent discloses means for communication with all other processors in the system to control memory access in a buffer/backing store memory heirarchy.

In Moore U.S. Pat. No. 3,778,780 a priviledged instruction, signal processor, is utilized to initiate communication between processors. This is accomplished by means of an operation request block (ORB) which contains parameters identifing a task. Only one ORB is provided in the system. An ORB pointer is passed from a sending unit (SU) to a receiving unit (RU). The ORB storage space is prepared by supervisory programming in the SU and contains the task pointer. The RU fetches the ORB, performs the task, then posts an interrupt to the SU. When SU honors the interrupt, it gets the ORB pointer from the RU. The SU in the supervisory state examines the ORB space and uses the task pointer to resume problem state execution.

The ORB concept is implemented in an operating system type of computer environment and utilizes priority interruption of the initiating unit in order to complete the transfer of intelligence via the communication mechanism.

In Bergh etal U.S. Pat. No. 3,820,079 the communication mechanism is distributed throughout the system. Each module in the system is provided with a Modular Control Unit (MCU) which controls the interface between modules. Any module can request information from any other module by manipulating registers and utilizing buffers in each MCU to retain control information concerning data transfers.

In Gray U.S. Pat. No. 3,833,889 communication between processors is accomplished by a dedicated hardware buffer, an interlock register, which handles the transfer of data without the data going through memory. It also communicates completion of a process when two or more processors are operating on the same problem. Data can also be transfered through the memory, in which case a flag is set in the interlock register which is then interrogated by the recipient processor when it is to accept the data. Special purpose hardware moves data in and out of the interlock register.

None of the prior techniques for interprocessor communication provide facilities for system-wide communication as well as processor specific communication, which facilities can be accessed by either system hardware or system software.

It is therefore a primary object of this invention to provide an interprocessor communication system which handles both system-wide as well as processor specific communication.

A further object of this invention is to provide an interprocessor communication mechanism that is hardware recognized and therefore does not require software control programming.

Another object of this invention is to provide means for locking a communication mechanism when a message is sent, and clearing the mechanism when all intended recipient processors have responded.

A further object of this invention is to provide means for enabling software to access the interprocessor communication mechanism.

A further object of the invention is to provide a mechanism for broadcasting a message to many processors, which mechanism has controls for ensuring that all processors have responded before allowing any more messages to be sent.

SUMMARY OF THE INVENTION

Briefly, the above objects are accomplished in accordance with the invention by providing each processor with a local communication segment, stored in memory. The local communication segments are for processor-specific communication. Another segment, the global communication segment, is common to all processors, and is for system-wide communication. Each communication segment has a field containing control flags. When set by a processor and later inspected by another processor, these control flags cause the inspecting processor to perform a number of functions.

In accordance with an aspect of the invention, a count field and a lock field are provided to interlock the communication mechanism. When a segment is used for communication, the lock field is energized to keep other processors from interfering. The count field is set to a specific value, for example the number of processors to respond, if a global message is being sent. The count field is decremented each time a processor responds. When the count reaches zero, all processors have responded, and the lock field is cleared, to allow other communication to take place.

In accordance with a further aspect of the invention, a status field is provided in the local communication segments. Each of the processor control flags is responded to in priority order, taking into account the state of the responding processor.

The present invention has the advantage that the communication mechanism is decentralized, and therefore is compatible with a modular multi-processing system.

The invention has the further advantage that since the communication mechanism is decentralized, the high cost per processor of a centralized system, in configurations wherein the number of processors is few, is avoided. With the present invention, where fewer processors are employed, the cost of the communication mechanism is proportionately less.

The invention also has the advantage that by providing status information within each local communication segment much greater flexibility is achieved. Since each processor control flag is responded to in priority order depending upon the state of the responding processor, the current processor state information is able to determine what effect the processor control flags have. By changing the status information in the communication segment, the effect of subsequent control flag interpretation can be changed.

The invention has the advantage that by providing extensive control functions by means of the control flags, it is unnecessary to invoke supervisory programs for the passing of system parameters.

DESCRIPTION OF THE DRAWINGS

The foregoing and other objects, features, and advantages of the invention will be apparent from the following detailed description of a preferred embodiment of the invention, as illustrated in the accompanying drawings wherein:

FIG. 2 is a diagram of a lock field of a communication segment;

FIG. 3 is a diagram of the processor status field of a local communication segment;

FIG. 4 is a block diagram of logic for hardware control of interprocessor communication;

FIG. 5 is a flow chart of the execution of the SEND TO PROCESSOR instruction;

FIG. 6 is a flow chart of the execution of the BROADCAST TO PROCESSORS instruction; and FIG. 7 is a flow chart of the response phase for either software or hardware initiated interprocessor communication.

DESCRIPTION OF THE INVENTION

Figure 1:
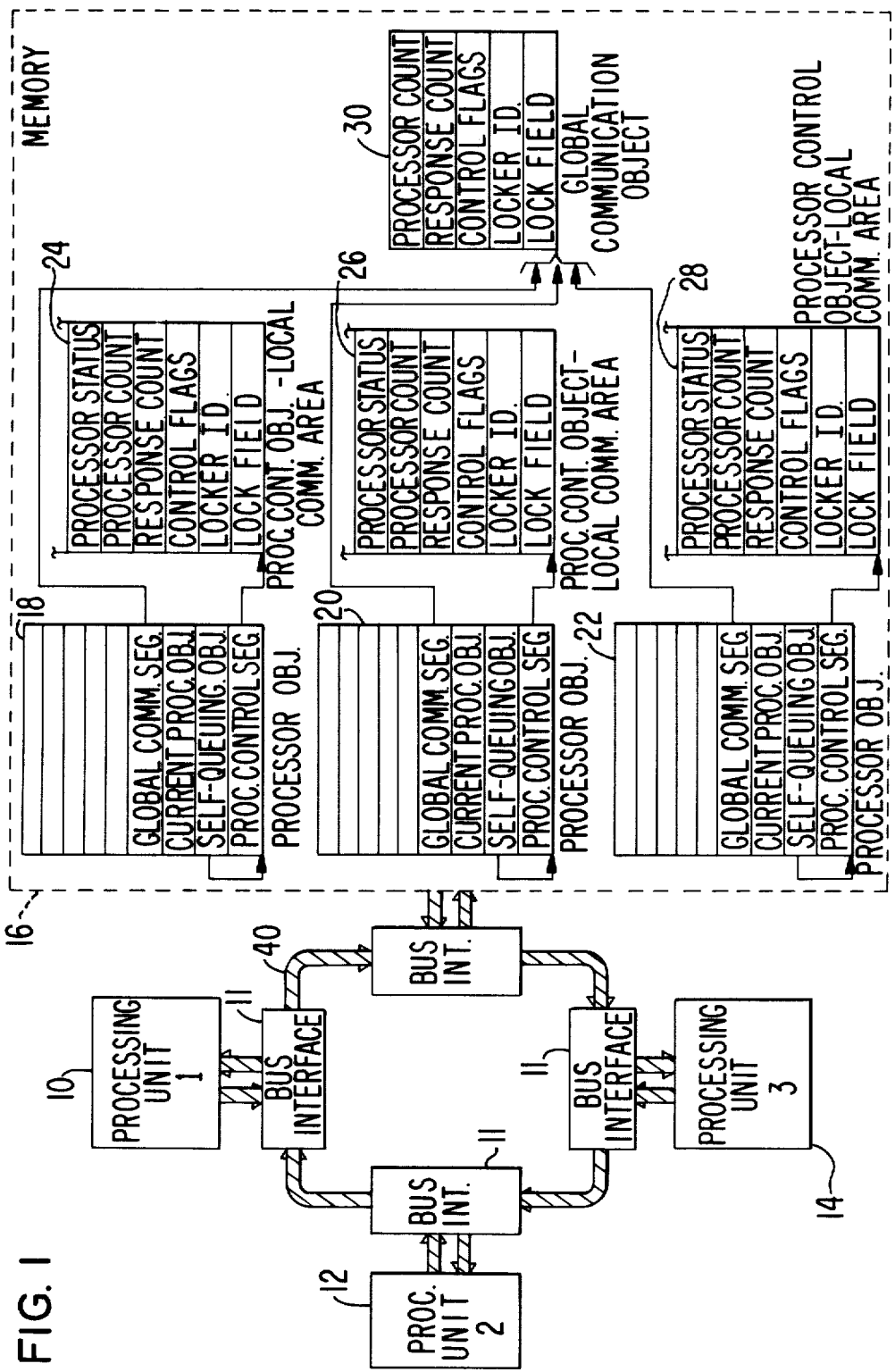
FIG. 1 is a block diagram of a multiprocessing system having three processors sharing a memory, and illustrates a portion of the data structure in the memory relating to each processor.

FIG. 1 is a block diagram of a multi-processing system in which the present invention is embodied. The overall system is more fully described in copending patent application entitled Data Processing System, by Stephen R. Colley, et al, application Ser. No. 971,661 filed on Dec. 21, 1978, now U.S. Pat. No. 4,325,120 which is incorporated herein by this reference. FIG. 1 of the present application is the same as FIG. 5 of Colley, et al, insofar as the loop interconnection of processors is concerned. The bus interface units, between the processors and the bus cable 40, and between the memory 16 and the bus cable 40, are the same bus interface units shown in FIG. 5 of Colley et al. A full description of this interconnection is found in the following section of Colley, et al: "PART 2. GENERALIZED DATA PROCESSOR & SYSTEM INTERCONNECTIONS." The interface connections, down to the input/output pin level of description, is described in the following section of Colley, et al: "9.0 INSTRUCTION UNIT." In section "9.6 INTERPROCESSOR COMMUNICATION" of Colley, et al the interprocessor communication mechanism of the present invention is described in detail. As stated therein the instruction unit contains the interprocessor communication logic. The instruction unit logic diagram is shown in detail in FIG. 7 of Colley, et al. The many details of the interface lines for signaling are not repeated in the present specification in order that the interprocessor mechanism as it relates to system objects in memory may be more clearly understood. Reference should be made to the above-cited sections of Colley, et al for such details, and in particular to the definitions of ISA and ISB given in section 9.1 of Colley, et al and the timing diagrams, FIGS. 10-12, relating thereto.

As more fully described in the above-referenced Colley et al application several processing units 10, 12 and 14 share a common memory 16. The processing units may be of two different types. The first type, general purpose processors, provide for a variety of programming situations of a general nature. The second type, input/output processors, provide for the direct, programmed control of microcomputer peripheral interfaces and for the direct transfer of data between main memory and those interfaces. As more fully described in the above copending application no processor interrupts or service requests are necessary in the system. This is because the facilities for insuring necessary isolation and communication between numerous concurrent tasks and the facilities to automatically assign available processors to ready to run tasks are provided in hardware. The task dispatching functions, traditionally performed by software supervisory programs, are accomplished by hardware controlled queuing mechanisms. The queuing mechanisms allow the different program to communicate with each other and permit asynchronous input/output programs to communicate with general purpose programs by sending messages. In this way the need to interrupt busy general purpose processors is eliminated.

Since common interrupts do not exist in the system, a mechanism must be provided to allow the processors to signal each other. The mechanism is needed to reawaken an idle processor to alert the the processor to the fact that a program has become available at a queue and needs execution. The present invention provides this mechanism.

Each processor is assigned a unique unit number. A temporary segment table containing segment descriptors is stored at physical address zero in the memory. This temporary segment table is used by the processor during initialization to locate its associated processor object. The term "object" is described in section 1.3 of Colley, et al and the term "processor object" is described in detail in section 4.8.1 of Colley, et al. Briefly, as described therein, a processor object is an information structure (an access list) stored in memory or in temporary registers which contains access information (access descriptors) associated with a processor. The initialization sequence is normally requested by means of an external hard wired signal; or the sequence may be requested by software by means of the inter-processor communication mechanism which is the subject of the present invention. The processor uses the unique processor unit number as an index into the temporary segment table. The processor retrieves the segment descriptor found at the indexed location. The segment addressable by means of that segment descriptor is the processor object for that processor.

The processor object, for example 18 in FIG. 1, contains a number of access descriptors which are referred to as entries in the processor object. The processor object is used to establish the processors accessability to its normal dispatching port and to a number of other system objects needed for proper operation. Only the processor object entries (access descriptors) necessary to an understanding of the present invention will be described herein. For a more complete description of the processor object and other objects of the system, reference should be made to the above identified Colley, et al patent application. As described in Colley, et al the first entry in the processor object is an access descriptor providing access to the process control segment (also called the process control object), which includes the local communications area, 24, 26, or 28, shown in FIG. 1 of the present specification.

The second entry in the processor object is the self-queuing object. This is an access descriptor for the processor object itself. The structure of this access descriptor is shown in more detail in the above indentified Colley, et at patent application. Access descriptors are used to protect access information from accidental or malicious damage and they are kept in separate segments called access lists. Whenever a processor is unable to find a ready-to-run process at a dispatching port, the event is reported by placing the access descriptor for its processor object on the server queue of that port. Having the second entry of each processor object contain an access descriptor for the processor object itself eliminates the need to generate such a descriptor dynamically. Whenever circumstances cause a processor to enqueue itself and go idle, the processor moves a copy of this access descriptor into the appropriate queue position at the port.

Access descriptors have what is referred to as a rights field, more fully described in the above-identified Colley, et at. patent application. The access rights field of the processor object access descriptor is interpreted as follows. If the field is set to 00, on interprocessor message may be broadcast via the global communication segment or sent to the processor via the processor control segment of the processor object. If the field is set to 01 this signifies that an inter-processor message may be broadcast by means of the global communication segment associated with the processor object. If the field is set to 10 this signifies that an inter-processor message may be sent by means of the local communication area of the processor control segment associated with the processor object. If the field is set to 11, no interprocessor messages may be sent. The term "local communications area" is described in detail in section 4.8.1.2 of the above referenced Colley, et al patent application. Briefly, as described therein, a local communications area is an information structure (a data segment) stored in memory or in temporary registers which can be accessed by a processor through use of access information (an access descriptor) stored in the processor object associated with the processor.

The next entry in the processor object is a data segment access descriptor which provides access to a data segment called its local communication segment.

The next entry is a process object access descriptor which identifies the process object which the processor is currently processing. The term "process object" is described in detail in section 4.7.1 of the above-referenced Colley, et al patent application. Briefly, a process object is an information structure (access list) stored in memory or in temporary registers which contains access information (access descriptors) associated with a process (or program) executable by a processor. The next entry in the processor object is a data segment access descriptor which points to a common communication area called the global communication segment 30.

Each processor object 18, 20, 22 has associated with it a processor control segment 24, 26, 28, respectively. The term "processor control segment" (also termed "processor control object", as in 24, 26, or 28 in FIG. 1) is described in detail in section 4.8.1.2 of the above-referenced Colley, et al patent application. Briefly, as described therein, a processor control segment is an information structure (an object comprised of a data segment) stored in memory or in temporary registers, which is used to record information relating to a processor associated with a processor object (comprised of an access list) which provides access to the processor control segment (through use of an access descriptor in the processor object). Part of the processor control segment is an area within the data segment called the local communications area. Other areas, not shown in FIG. 1, of the present specification record fault and diagnostic scan information. A processor is able to receive information directed to it from other processors by inspecting, when requested, the contents of the local communication area within its control segment. The interprocessor message takes the form of a double byte bit field containing a set of processor control flags. The message is stored in these flags by the sending processor.

In order to interlock the transmission of multiple, simultaneous inter-processor messages, each local communication area contains a lock field, the format of which is shown in FIG. 2.

Referring now to FIG. 2, the lock field includes a bit position called the hardware request lock, a bit field called the software request lock, and a bit position called the response lock. The request locks and the response lock must be clear before transmission begins. At the onset of communication, both one of the request locks and the response lock are set. Following the communication, the request lock is cleared and the response lock is left set until the receiving processor has carried out the functions specified by the control flags which constitute the message.

Three other fields in the local communication area participate in the message interlock function. These fields are the locker ID, processor count and the response count. The locker ID contains information identifying either the process or the processor which did the locking. At the time the message is sent, the sending processor initializes the response count to the processor count value. The processor count value is previously set by software. When the receiving processor completes the requested function, it decrements the response count and tests the new value for zero. If the decremented value is zero, the processor then clears the response lock, thus opening the channel for further communication. Normally the processor count value in a local communication area will be initialized to one.

Another field is utilized in the local communication area. This field is the processor status field and contains status information about the associated processor. The format of the processor status field is shown in FIG. 3. The processor status field has several subfields describing the processor state, dispatching mode, processor type, and the unique processor unit number discussed above.

The meaning of these modes of operation is more fully explained in the above identified Colley, et al patent application. Inter-processor messages can be used to request a processor to either enter or exit the alarm dispatching mode or the diagnostic dispatching mode, in addition to alerting a processor that a ready to run process has been queued at its dispatching port.

The processor type subfield is interpreted as follows:
00-generalized data processor
01-input/output processor All of the subfields in the processor status field are initialized and maintained by the processor with which the local communication area is associated.

In some situations it is desirable to communicate with all the processors in a system when a message of common interest must be transmitted. It is awkward to communicate with the processors on an individual basis through their local communication area. For this reason, each processor is given access to a common communication area called the global communication segment 30. The fourth entry in the processor object is a data segment access descriptor which provides access to the global communication segment. The structure of the global communication segment is identical to that of a local communication segment, with the exception that it does not contain the processor status field. This is because the global communication segment is not associated with a particular processor. Therefore the status field has no meaning.

The processor count is set by system software to be equal to the total number of processors having access to the global communication segment. In the system shown in FIG. 1 the processor count field would therefore be set to 3 because there are three processing units in the system. The request lock and the response lock operate in the same manner as described for local communication areas. One of the request locks and the response lock must be clear before transmission begins. At the onset of communication both locks are set. The message is placed in the control flags portion in the manner as described for local communication areas. The request lock is then cleared but the response lock is left set until each processor has responded to the message. At the time the message is sent, the sending processor initializes the response count so that it is equal to the processor count value. In the case of the system shown in FIG. 1 the response count would be set to 3. As each processor responds to the message it decrements the response count and tests the new value for zero. If the new value is not zero the processor does nothing thus allowing other processors to respond to the message. If the decremented value is zero, the processor is the last processor to respond to the message and therefore clears the response lock. This insures that all processors have responded before another message is accepted.

A processor does not automatically or periodically check the local communication area or the global communication segment for messages. This would be a waste of processing time. A hardware means is provided for signalling a processor or all processors that a message has been posted in its local communication area or in the common global communication segment. The means for doing this is included within the bus interface logic blocks shown in FIG. 1. The details of this logic are shown in FIG. 4.

Referring now to FIG. 4, the bus interface logic of one of the blocks 11 of FIG. 1 is shown in more detail. The blocks 11 are used to construct a closed loop of all the processing units in the system around which inter-processor communication information flows.

First a processor places a message in the local communication area of the processor with which it wishes to communicate, or in the global communication segment. The processor sending the message then initiates a signalling procedure over the bus interface to inform the target processor that there is a message intended for it. The processor places information into the processor interface logic 34, via cable 32. The logic 34 recognizes that it is an interprocessor communication (IPC). The logic 34 works in conjunction with IPC logic which changes the message into the proper format for transmission via message transmission logic 38 over the bus cable 40. This message includes a number identifying the target processor and coding specifying a local or global message.

At the target processor, the message is received over cable 42 into message reception logic 44, which determines if the message is intended for this processor, the message is transferred to IPC reception logic 46, which works with logic 34 to inform the processor over cable 33 that a local or global communication IPC message is waiting for it in the appropriate memory area. This IPC flag is latched into the processor.

A busy flag is set while the processor's microcode is responding to an inter-processor communication signal (IPC flag set).

An interprocessor communication message trap can occur only in between execution of macro-instruction and then only if the IPC flag is set on and busy is off. Once the trap has taken place, the IPC flag is cleared and busy is turned on. Busy stays on while the microcode is responding to the interprocessor communication message. Other interprocessor signals may be received during this period and the reception of one will cause the IPC flag to go on again.

After completion of the processors response to the interprocessor communication message, the busy flag is turned off. Another trap will then occur if during the interim any further interprocessor communication signals have been detected and thus turned on the IPC flag. When a processor asserts its own IPC-out, its IPC-in will also be effected and thus a trap of the message will result. This mechanism insures that all processors intended to receive a global communcation message, including the processor posting the message, will respond to the message.

The control flags in an interprocessor communication segment define processor control functions to be performed by the processor. Response to these control flags is in a priority order as more fully described in the above identified Colley, et al patent application.

Whether the message is received via the common global communication are or by means of the local communication segment associated with a specific processor, the response to the control flags will be affected by the processor status information found in the processors associated local communication segment. Therefore, each processor responds to the processor control functions in a manner determined by its present state.

Every interprocessor communication has two phases, a request phase and an associated response phase, whether the communication was invoked by hardware or software.

Referring to FIG. 5 the processor performs a local communication function as follows, as illustrated by the execution of the SEND TO PROCESSOR operator. The SEND TO PROCESSOR allows a process to send an interprocessor message to one specific processor, including the processor it is executing on, via the interprocessor communication mechanism. A processor can send a similar message to another processor by invoking the same hardware logic execution.

The first step 50 is a data reference which specifies a short-ordinal operand containing the processor control flags. The second data reference 52 specifies a short-ordinal operand containing the segment selector for an access descriptor for the desired processor object.

The next step 54 is a decision block in which the access descriptor is checked to see if it is a processor object access descriptor. If not, a processor object type fault occurs and the branch is to block 58. If the access descriptor is a processor object access descriptor the branch is to block 59 wherein the object is checked to see if it allows local communication. If not, a processor object rights fault occurs, block 60. If local communication is allowed, the branch is to block 61 in which case the processor gains access to the local communication area in the processor control object which is obtained from the information in the second entry of the processor object.

The access descriptor is checked in decision block 62 to see if it is a processor control object access descriptor. If not, a processor control object type fault occurs, block 63. If so, flow proceeds to decision block 64.

The processor checks the lock field in decision block 64 to see if either the request lock or the response lock is set. If either lock of the accessed communication segment is set, the process executing the instruction reattempts the instruction after idling for a predetermined number of machine cycles, as illustrated by block 68. When both locks are cleared the processor sets both the request lock and the response lock, block 70. The processor now places the message in the form of the processor control flag into the communication field, which is the second entry in the local communication segment (block 72).

Finally, the processor clears the request lock, (block 74), and notifies the target processor by means of an IPC bus signal that there is a message for it to inspect in the communication segment (block 76).

Referring now to FIG. 6, the request phase during a broadcast communication is similar to that described above with the exception that a process or a processor may broadcast an interprocessor message to all the processors in the system. In the case of a global IPC message transmitted by a process, the processor on which the transmitting process is executing also receives the message.

As with the send to processor instruction, the first step 80 is a data reference which specifies a short ordinal operand containing the processor control flags. A second data reference step 82, specifies a short ordinal operand containing the segment selector for an access descriptor for the desired processor object.

Operator execution proceeds as follows. If the access descriptor is not a processor object access descriptor (decision block 86) a processor object type fault occurs (block 88). Flow proceeds to decision block 90. If the access descriptor is a processor object access descriptor but does not bear global communication rights, as indicated by the access rights field of the descriptor then a processor object rights fault occurs (block 92).

If the access descriptor is correct then at block 94 the processor gains access to the global communication object by fetching the access descriptor for the global processor communication segment which is found in the fourth entry of the processor object. The access descriptor is checked at decision block 95 to see if it is a communication control object access descriptor. If no, a global communication object type fault occurs, block 96. If yes, flow proceeds to block 98.

If either the request lock or the response lock (block 98) of the accessed communication segment is set, the processor executing the instruction performs the restart procedure block 100. When both locks are clear and therefore the communication segment is free to be accessed, the processor sets both the request lock and the response lock, (block 102). Next the processor stores the processor control flags (which have been set to contain the message) into the communication field of the global communication segment (block 104). Next the processor initializes the response count so it is equal to the processor count (block 106). Next the processor clears the lock field by clearing the request lock (block 108) and notifies all the processors by means of an IPC bus signal so that they will inspect the global communication segment during a response phase (block 110).

Referring to FIG. 7, the response phase to either a local communication message or a global communication message is as follows. The processor is constantly monitoring the bus interface logic (block 120). The bus interface logic indicates that a local communication is being signaled to take place or indicates that a global communication is being signalled to take place. At decision block 122, if a local IPC is indicated, the processor gains access to its local communication area of the processor control object via the current processor object (block 124). If a global IPC is indicated the processor gains access to the common global communication object via the current processor object (block 126). The object accessed is tested (blocks 128, 132) to see if it's of the appropriate type. If not, an object type fault occurs (blocks 130, 134). If no fault occurs, the execution proceeds to block 136 wherein the processor fetches the processor control flags from the communication area indicated by the access descriptor fetched by either step 124 or step 126.

The processor then responds to the message as contained in the control flags and performs the processor control function requested by the control flags and updates the processor status accordingly, as indicated in logic block 137. Next in logic block 138 the processor decrements the response count in the communication segment. Flow proceeds to decision block 140. If the response count is zero the processor clears the response lock in the communication segment to thereby make the communication segment available for another message (block 142) and terminates the operation.

During the request phase, the response count is initialized to the processor count. Then during the response phase, the response count is decremented by each processor as it responds. Therefore the response count will not reach zero until the last processor has responded to the message and resets the response count. Therefore a negative out of the decision block 140 for a specific processor merely terminates the operation for that processor and the next processor in turn responds to the global communication message.

SUMMARY

What has been described is apparatus for providing a communication mechanism for use in a multi-processing system wherein several processors share a common memory. Each processor is represented by a processor object which is a data structure stored in memory. Associated with the processor object and located by means of an access descriptor is a local communication segment also stored in memory. The local communication segment is for processor-specific communication. Another segment accessed by another access descriptor stored in the processor object, called a global communication segment, is common to all processors and is for system wide communication.

Each communication segment, whether it be a local segment or the common global segment, has a field containing control flags. The control flags represent a number of control functions which a processor is able to carry out. The flags are set by one processor or by a software program and are later inspected by the same or another processor. When an interprocessor communication is initiated the sending processor sends a signal via the bus to the target processor or the target processors to inform them that they should inspect either their own local communication segment or the common global communication segment. The inspecting processor then fetches the associated communication segment, examines the control flags, and performs a number of functions specified by the state of the control flags.

A count field and a lock field are provided in all communication segments to interlock access to the communication mechanism to resolve contention situations. For both communication types of IPC operations the count field is set to a count which is equal to the number of processors which are to respond to the message. As each processor responds it decrements the count field. The last processor to respond knows of this by the fact that the count field is reduced to zero. It then clears the communication segment to make it available for subsequent communication messages.

A status field is provided in the local communication segments. Processors constantly update this status information and take the state of the status field into consideration when interpreting the control flags.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. For use in a multiprocessor system comprised of a plurality of processors and a memory shared by said processors, said plurality of processors including a sending processor and a target processor, an interprocessor communication mechanism comprising:

first means in said target processor for storing first access information, said first access information providing access to a first processor object stored in said memory, said first processor object being associated with said target processor;

second means in said sending processor for storing second access information, said second access information providing access to a second processor object stored in said memory, said second processor object being associated with one of said plurality of processors;

a communication segment stored in said memory, said communication segment including a field of control bits specifying communication functions;

each of said first and second processor objects including third access information (a communication segment access descriptor) providing access to said communication segment;

third means in said sending processor connected to said second storing means and to said memory for using said second access information to gain access to said second processor object and to said third access information (communication segment access descriptor) included therein;

fourth means in said sending processor for storing said third access information, said third access information providing access to said communication segment, in order to place a message in said communication segment, said message including said field of control bits specifying communication functions;

fifth means in said target processor connected to said first storing means and to said memory for using said first access information to gain access to said first processor object and to said third access information (communication segment access descriptor) included therein;

sixth means in said target processor for storing said third access information, said third access information providing access to said communication segment, in order to examine said control bits to thereby distinguish a function to be performed; and, means connected between said sending processor and said target processor for signaling said target processor to thereby inform said target processor that there is a message in said communication segment;

whereby said sending processor can send a message (in the form of said field of control bits) to said target processor by utilizing said communication segment.

2. The combination in accordance with claim 1 wherein said communication segment is common to said plurality of processors.

3. The combination in accordance with claim 2 wherein said communication segment contains a processor count field capable of being set to be equal to the total number of processors having access to said segment; and
 a response count field which is capable of being initialized to the processor count value by said sending processor;
 whereby the relationship between said processor count and said response count is able to provide an indication as to how many processors have responded to said message.

4. The combination in accordance with claim 3 wherein said communication segment includes a lock field which is set when a message is placed in said communication segment, and which is cleared upon the condition that the response count reaches zero thus indicating that the total number of processors having access to said segment have responded to said message.

5. The combination in accordance with claim 1 wherein said communication segment is associated only with said target processor (a local communication segment), and wherein said improvement further comprises:
 a plurality of additional local communication segments, each one associated with a specific one of the remaining ones of said plurality of processors.

6. The combination in accordance with claim 5 wherein said improvement further comprises:
 a common communication segment which is common to all of said plurality of processors.

7. The combination in accordance with claim 6 wherein said processor object includes control means stored therein (an access descriptor) identifying said processor object, said control means further including an access-rights field, selectively settable to a first state and a second state, said first state permitting an interprocessor message to be received via said local communication segment associated with said processor object, and said second state permitting an interprocessor message to be broadcast via said common communication segment.

8. The combination in accordance with claim 5 wherein each additional communication segment contains a processor status field containing status information about the associated processor.

9. The combination in accordance with claim 8 wherein said processor status field includes a processor unit number.

10. The combination in accordance with claim 1 wherein said communication segment contains a set of exclusion flags for interlocking the transmission of interprocessor messages.

11. The combination in accordance with claim 10 wherein said exclusion flags include a request lock and a response lock whereby at the onset of communication, both said locks are set, and following the communication the request lock may be cleared with the response lock left set until said target processor carries out the functions requested by said message.

12. The combination in accordance with claim 1 wherein said sending processor and said target processor are the same processor;
 whereby a processor can send a message to itself.

13. The combination in accordance with claim 1 wherein said communication segment comprises a field containing a number of processor control flags;
 whereby when said flags are set by said sending processor and later inspected by said target processor having access to said communication segment, the inspecting-target processor may perform a variety of functions depending on the setting of said control flags.

* * * * *